United States Patent [19]

Hochstein

[11] Patent Number: 4,819,225
[45] Date of Patent: Apr. 4, 1989

[54] REDUNDANT AND FAULT TOLERANT COMMUNICATION LINK

[76] Inventor: Peter A. Hochstein, 2966 River Valley Dr., Troy, Mich. 48098

[21] Appl. No.: 23,811

[22] Filed: Mar. 9, 1987

[51] Int. Cl.$^4$ .............................................. H04L 1/22
[52] U.S. Cl. ...................................... 370/16; 375/38; 371/68
[58] Field of Search ...................... 370/16, 88; 375/38, 375/40; 371/68, 34, 8; 340/825.01

[56] References Cited

U.S. PATENT DOCUMENTS

| | | | |
|---|---|---|---|
| 2,892,888 | 6/1959 | James et al. ............................ | 375/40 |
| 3,800,164 | 3/1974 | Miller ..................................... | 371/68 |
| 3,963,988 | 6/1976 | Niethammer .......................... | 375/40 |
| 4,380,814 | 4/1983 | Shinmyo ................................ | 370/40 |
| 4,627,045 | 12/1986 | Olson et al. ............................ | 370/16 |

*Primary Examiner*—Douglas W. Olms
*Attorney, Agent, or Firm*—Reising, Ethington, Barnard, Perry & Milton

[57] ABSTRACT

A multiplexor system includes a transmitter (11) and receiver (13) with a communication link (12) interconnecting therebetween. One embodiment includes at least two communication links (12) transmitting identical information therealong producing a redundant system being tolerant of shorting to a positive or negative supply or discontinuance of any of the communication links (12). The transmitter (11) selects (22) the digital data to be transmitted which is encoded and serially transmitted along the communication links (12). The receiver decodes (52) the serial signals producing the digital data. A detector (44, 45) interconnects the communication links (12) and the decoder (52). If no pulses are detected (44, 45), the respective link (12) will be electrically disconnected (46). The remaining links (12) will be OR'ed (50) and sent to the decoder (52). If a short to the positive or negative supply, or discontinuance occurs on any of the communication links (12), the output (16) will be held high and electrically disconnected by the detector (44, 45). An additional or alternative embodiment includes a transmitter power control (36), which discontinues power to the transmitter (11) when no data is selected by switches (22). There is also a receiver power control (60) which discontinues power to the decoder (52) and latches (55, 56) while waiting for a pulsed signal.

28 Claims, 5 Drawing Sheets

REDUNDANT AND FAULT TOLERANT COMMUNICATION LINK

TECHNICAL FIELD

The invention relates to a multiplexing system having redundant communication links.

BACKGROUND ART

Multiplexing involves the coding and subsequent decoding of several channels of information for transmission over a single line or communication link. For critical applications, the standard single line data bus commonly used in multiplexing systems is not suitable. When all systems and circuits are put on one line, the integrity of these systems is comprised by damage to this one line or bus. Therefore, multiple sets of data lines in physically separated locations carrying the same data are used. The redundancy of data lines is appealing in automotive electrical systems because of damage susceptibility and attendant safety implications. Virtually all multiplex systems which have been applied to automotive systems consume significant quiescent current, thereby causing undesirable battery drain.

One such redundant multiplexing system uses multiple input lines which are split and sensed by a pair of independent multiplexers. Each multiplexer sends its output to a separate demultiplexer, and the multiple outputs from the pair of demultiplexers are then combined. The U.S. Pat. No. 3,940,566 issued Feb. 24, 1976 in the name of Jeppsson et al discloses such a system where separate multiplexers and demultiplexers are used for redundancy purposes. A problem with such an assembly is the expense involved with each additional multiplexer and demultiplexer. Also, data transmission problems arise if faults occur to the communication line.

SUMMARY OF THE INVENTION

The invention is a multiplexing assembly and method for communicating electrical signals along multiple links while being tolerant of shorting to a positive supply or negative supply or discontinuance of any one of the communication links. The assembly comprises at least two communication links for transmitting signals therealong between inputs and outputs thereof. A transmitter means is connected to the inputs of the communication links for identical and continuous transmission of a pulsed signal containing at least one pulse along the communication links. A receiver means is connected directly to the outputs of the communication links for producing at least one control signal in response to receiving the pulsed signals. The assembly is characterized by including detector means to independently interconnect each of the communication links and receiver means for producing enabling signals electrically disconnecting said receiver means from any one of the communication links from the receiver means in response to an absence of the continuous pulsed signal on any one of the outputs of said one of said communication links.

Another embodiment of the invention is a multiplexing assembly for communicating electrical signals along a communication link comprising at least one communication link having an input and an output for transmitting signals therealong between the input and the output thereof, transmitter means connected to the input of the communication link for identical and continuous transmission of a pulsed signal containing at least one pulse along the communication link, and receiver means connected directly to the output of the communication link for producing at least one control signal in response to receiving the pulsed signal. The transmitter means includes multiple input lines representing data to be transmitted, encoding means for converting the multiple input lines into a single serial data output and producing the pulsed serial signal, and sender means for transmitting the pulsed signal along the communication link. The assembly is characterized by the transmitter means including transmitter power control means for preventing the transmission of erroneous information along the communication link by firstly disconnecting power first to the encoding means while holding the sender means in a low state when no pulsed signal is being transmitted and secondly disconnecting power to the sender means.

An additional embodiment of the invention is a multiplexing assembly for communicating electrical signals along a communication link comprising at least one communication link for transmitting signals therealong between an input and output thereof, transmitter means connected to the input of the communication link for identical and continuous transmission a pulsed serial signal containing at least one pulse along the communication link, and receiver means connected directly to the output of the communication link for producing at least one control signal in response to receiving the pulsed signal. The receiver means includes means for receiving the pulsed signal and producing a single serial data output signal and decoding means for converting the single serial output signal into a multiple receiver means. The assembly is characterized by the receiver means including receiver power means for discontinuing power to the decoding means when no pulsed signal is received by the means.

The advantage to this type of a system is that a single multiplexer and demultiplexer are used which result in cost benefits and a system which is tolerant to faults occurring to the communication links. An additional advantage is the turning off of power to prevent current drain on a voltage source.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
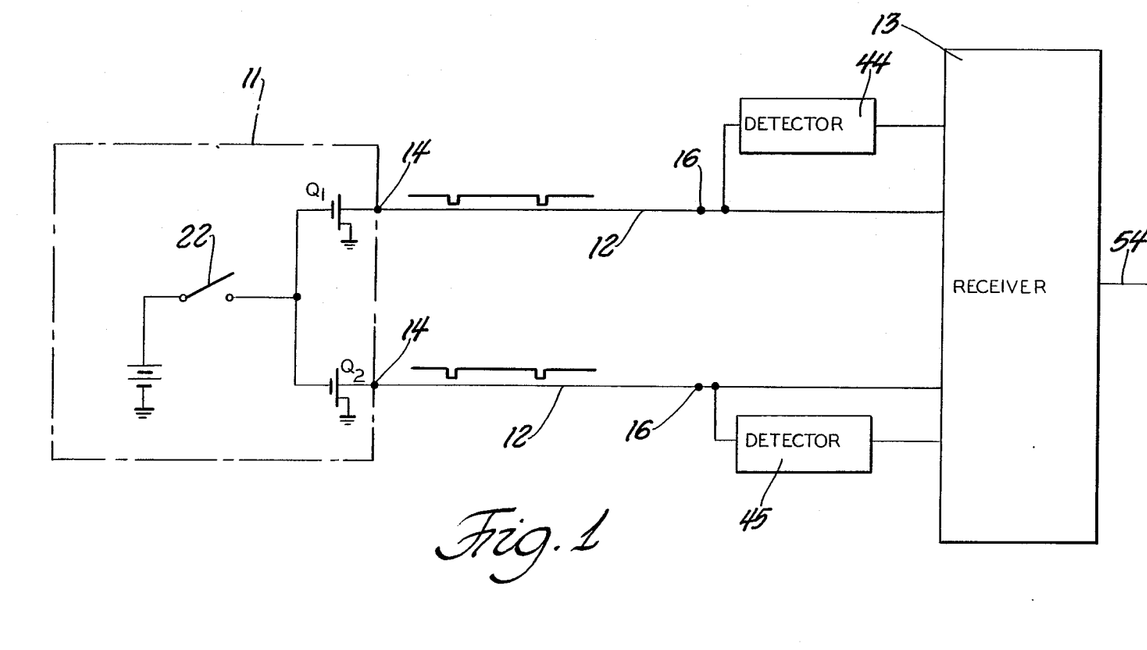
FIG. 1 is a schematic of the subject invention.
Figure 2:
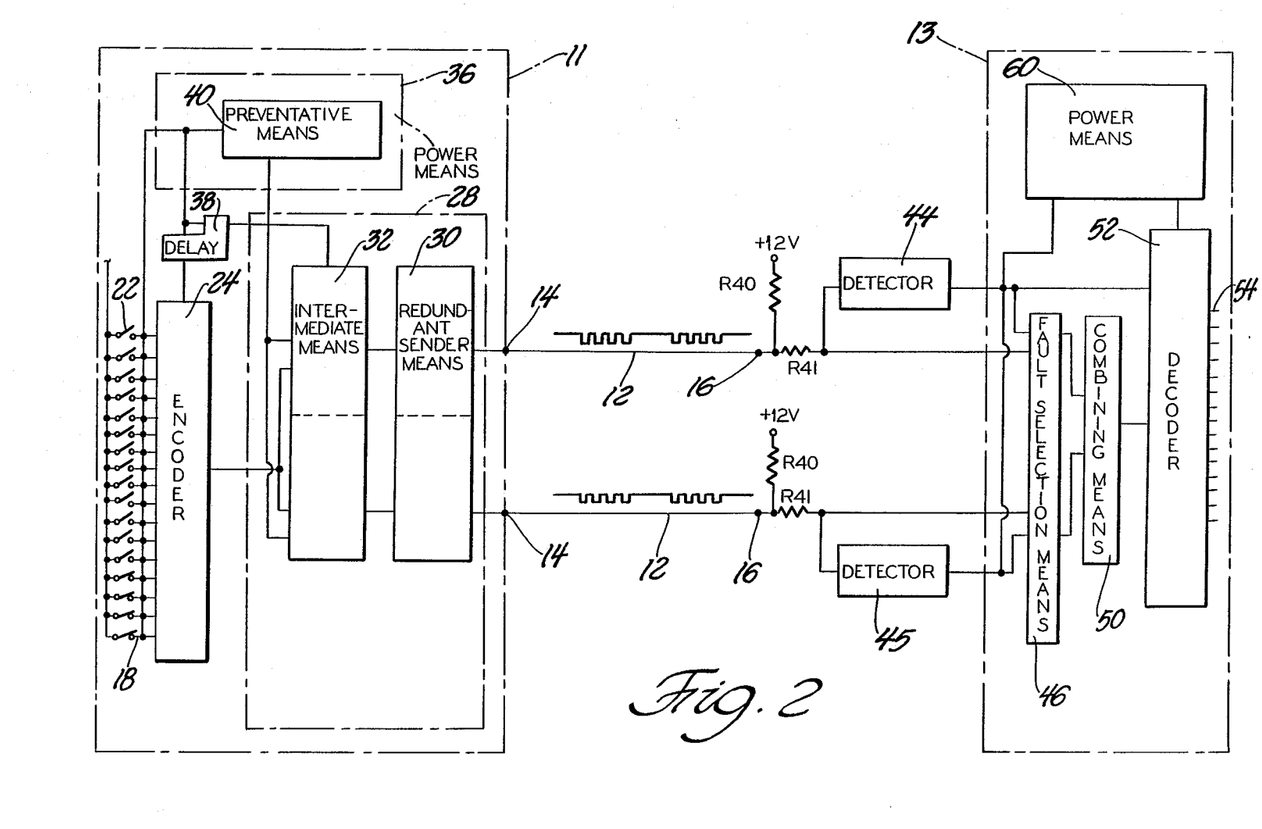
FIG. 2 is another and more detailed schematic of the subject invention.
Figure 3:
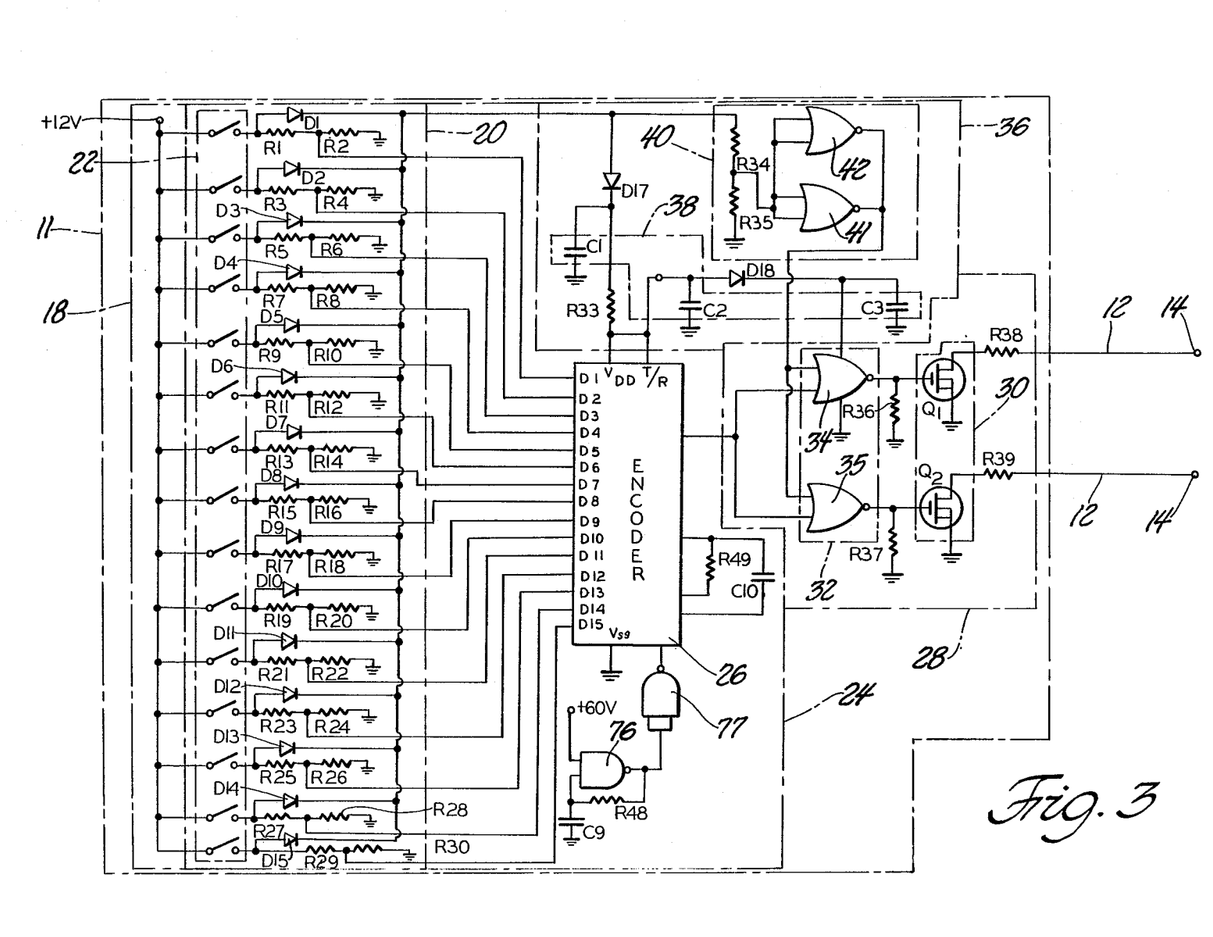
FIG. 3 is a circuit diagram of the transmitter means of the subject invention.
Figure 4:
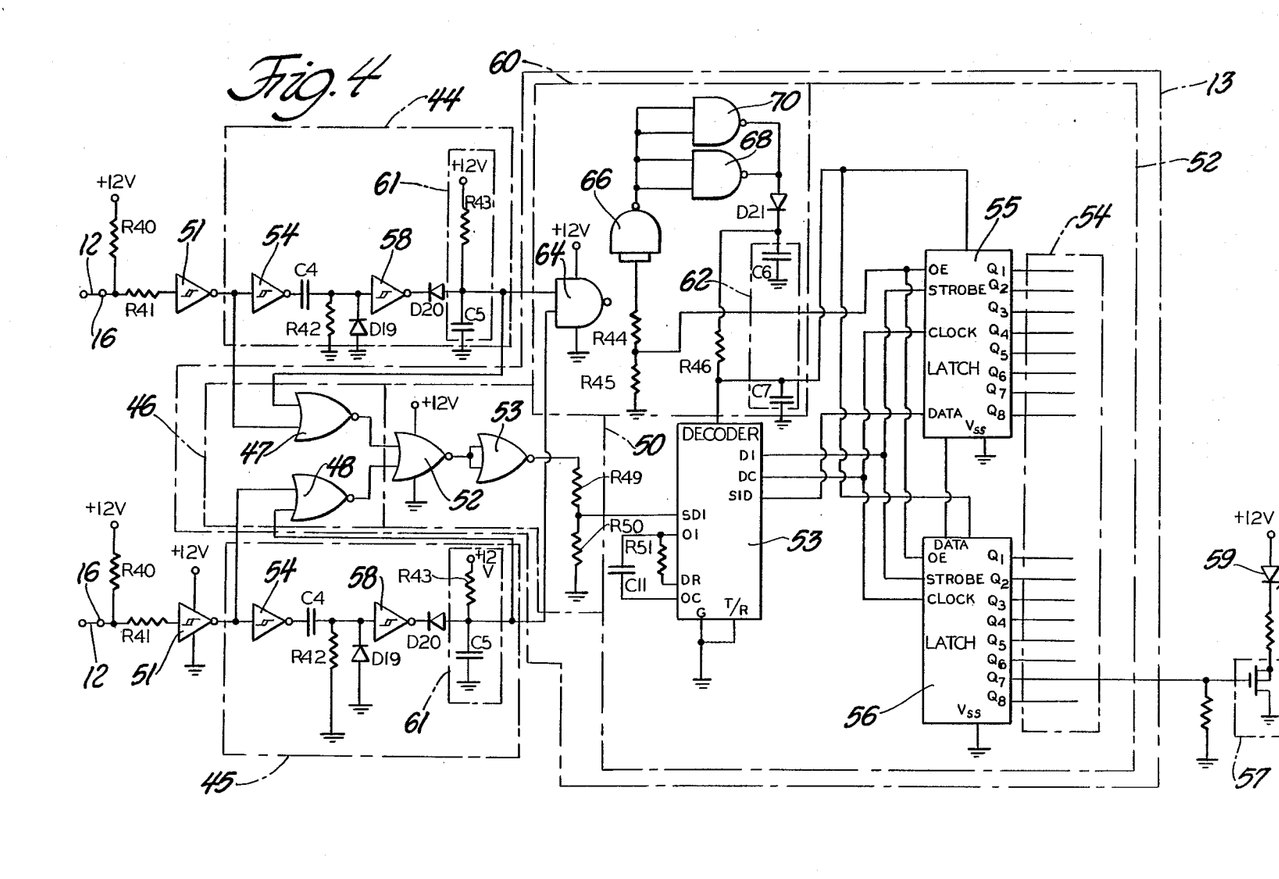
FIG. 4 is a circuit diagram of the receiver means of the subject invention.

A multiplexing assembly for communicating electrical signals along multiple communication links 12 while being tolerant of shorting to a positive or negative supply or discontinuance of any one of the links is generally shown in FIGS. 1 and 2. The assembly includes at least two communication links 12 for transmitting signals therealong between inputs 14 and outputs 16 thereof. The communication links 12 can be cable lines, or optical or radio links. The assembly includes transmitter means 11, shown in FIGS. 1, 2, and 3, connected to the inputs 14 of the communication links 12 for identical and continuous transmission of a pulsed serial signal containing at least one pulse along the communication links 12. A receiver means 13, shown in FIGS. 1, 2, and 4 is connected directly to the outputs 16 of the communication links 12 for producing at least one control signal in response to receiving the pulsed serial signals.

The transmitter means 11 includes multiple digital input lines 18 providing multiple data to be selected therefrom. A selection means 20 selects the data from the multiple digital input lines 18 to be transmitted along the communication links 12. The selection means 20 includes a plurality of switches or switch means 22 which, when independently closed, indicate the specific data to be sent along the communication links 12. The pulsed serial signal is in the form of a data frame and a synchronization frame, as well known in the art. The data frame has a plurality of timed pulse data slots wherein each of the data slots is representative of the state of each of the input lines 18. Each multiple input line 18 is represented by a respective time slot in the data frame. Therefore, each multiple input lines 18 will either be ON or OFF which is represented by either a high or low voltage in the time slots. For transmission and reception of a signal to occur, one switch 22 must be closed which corresponds to at least one pulse within the serial pulsed signal, as will be further explained hereinafter. As shown in FIG. 2, four switches 22 are closed which results in a pulsed signal containing four pulses within the data frame, representative of the closed switches 22. The data on the communication links 12 are active low. In other words, the link 12 is high except at each pulse which pulls the link 12 low.

The transmitter means 11 further includes encoding means 24 for converting the multiple input lines 18 into a single serial data output line which will be sent along the communication links 12. The encoding means 24 may be a commercially existing and available integrated circuit chip 26, such as the Supertex ED-15. This chip 26 is capable of transmitting fifteen separate binary data channels over one serial data line. Therefore, as shown in FIGS. 2 and 3, the encoding means 24 is able to receive fifteen input lines. The signal on the input lines is a dc signal representing an ON state with a high voltage and an OFF state with a low voltage, selected by the switches 22. The pulsed data signal is continuously repeated at the output of the encoder chip 26.

The transmitter means 11 includes a redundant sender means 28 for receiving the single serial data output line and for producing the pulsed signals on each of the communication links 12. In other words, the redundant sender means 28 receives the single serial data output from the encoding means 24 and splits the single serial data output between at least two communication links 12. Therefore, each communication link 12 will send identical information therealong. The redundant sender means 28 includes transistor means 30 for transmission of the pulsed data signal along each of the communication links 12. Also included is intermediate means 32 for receiving the single serial data output line and driving the transistor means 30. The single serial data output line is tapped into two lines and sent to the intermediate means 32. There is a first 34 and second 35 intermediator respectfully associated with the two communication links 12 which receive the serial data output line and, under proper conditions as explained subsequently, will repeat the pulsed data pattern at a set level driving the transistor means 30, which in turn duplicates the pulsed data signal on the communication links 12. The transistor means 30 is driven as common source switch which draw some current to present a low impedance to the receiver means 13.

The transmitter means 11 includes transmitter power control means 36 for discontinuing power to the encoding means 24 and to the redundant sender means 28 when the selection means 20 is inactive, or all switches 22 are open. If any one of the switches 22 are closed, the power will be supplied to the encoding means 24 and the redundant sender means 28 so that the data will be sent along the communication links 12. The transmitter power control means 36 includes delay means 38 connected between the selection means 20 and the encoder means 24 and redundant sender means 28 for delaying the discontinuation of power for a predetermined time delay. After the last switch 22 is opened, the transmitter power control means 36 will discontinue the power to the encoding means 24 and the redundant sender means 28 using the predetermined time delay to prevent erroneous information from being sent along the communication links 12. The transmitter power control means 36 will discontinue power first to the encoding means 24, and then to the redundant sender means 28. The discontinuance of power will prevent any drawing of current from the power source. Transmitter means shutdown procedure is very important because synchronization within each data frame must be maintained between the transmitter means 11 and receiver means 13 at all times.

The transmitter power control means 36 includes preventative means 40 responsive to the switch means 22 and connected to the intermediate means 32 for preventing the transmission of erroneous information. When the last switch 22 is opened, the preventative means 40 responds by holding the intermediate means 32 in an off state thereby disallowing the transmission of any data from the encoding means 24. The power to the encoding means 24 is then discontinued after a first time delay, and the power to the intermediate means 32 is discontinued after a second and later time delay.

The intermediators 34, 35 include respective intermediator NOR gates 34, 35 associated with each of the communication links 12 for receiving the serial data output line and the output of the preventative means 40 driving the transistor means 30. The transmitter power control means 36 includes input diodes D1–D15 connected to the output of the switch means 20 for supplying power to the transmitter means 11 only when at least one of the switches 22 is closed.

The multiple input lines 18 are connected to a voltage source 42, such as a 12 volt supply. The switch means 22 is connected between the multiple input lines 18 and the remaining transmitter means 11. Each switch of the switch means 22 is connected to the input diodes D1–D15 and a resistive voltage divider circuit R1–R30. The diodes D1–D15 connect power to the transmitter power control means 36, and the resistive voltage divider circuits R1–R30 connects each input to the encoder means 24. The encoder means 24 includes the encoder chip 26 with associated connections including a pair of encoder power control NAND gates 76, 77, an encoder resistor R48 and encoder capacitor C9, and a second encoder resistor R49 and capacitor C10. The output of the input diodes D1–D15 are combined to produce a single power control signal to the transmitter power control means 36. The transmitter power means 36 includes a first transmitter diode D17 receiving the power control signal and connected to a first transmitter delay capacitor C1 which is connected to ground. A resistor R33 is connected to the output of the first transmitting diode D17 to the voltage supply of the encoder chip 26. The resistor R33 is connected to a second transmitter delay capacitor C2 to ground, and a second transmitter diode D18 connected between the resistor R33 and the power supply terminal of the intermediate means 32. A third transmitter delay capacitor C3 is connected between the second transmitter diode D18 and ground comprising a further power supply delay. The preventative means 40 includes a voltage divider circuit comprising two resistors R34, R35 which receives power signals. The preventative means 40 includes two preventative NOR gates 41, 42 the which receive the voltage divided signal. The output of the preventative NOR gates 41, 42 is sent to the intermediate means 26. The intermediate means 32 comprises the two intermediator NOR gates which receive the tapped signal from the serial data output of the encoder chip 26 and the signal from the preventative means 40. The transistor means 30 receives the output from the intermediate means 32 biased by pull-down resistors R36, R37. The transistor means includes FETs Q1, Q2. The FETs Q1, Q2 drive the pulsed data signal along the communication links 12 through current limiting resistors R38, R39. The pull-down resistors R36, R37 keep the FETs Q1, Q2 off and non-conducting when the power is discontinued to the transmitter means 11. The current limiting resistors R38, R39 protect the FETs Q1, Q2 if the line is shorted to the positive supply.

The assembly is characterized by including detector means 44 to independently interconnect each of the communication links 12 and the receiver means 12 for producing enabling signals for electrically disconnecting any one of the communication links 12 from the receiver means 13 in response to an absence of a continuous pulsed signal on any one of the outputs 14, 16 of the communication link 12. The assembly is broadly illustrated in FIGS. 1 and 2. Included is the transmitter means 11 and receiver means 13, with the detector means 44 interconnecting the communication links 12 and receiver means 13. The detector means 44, 45 includes at least a first detector 44 for independently connecting one of the communication links 12 to the receiver means 13 and a second detector 45 for connecting the second of the communication links 12 to the receiver means 13. In other words, as long as the continuous pulsed data signal is detected by the detector means 44, 45, the communication link 12 will be connected to the receiver means 13 receiving the information therefrom. If one of the detectors 44, 45 does not detect the continuous pulsed data signal, the respective communication link 12 will not be allowed to send the information to the receiver means 13. Each detector 44, 45 establishes a time constant which is chosen to have a period of approximately two data frames.

The receiver means 13 includes fault selection means 46 for receiving the outputs 16 and the enabling signal to produce data signals replicating the outputs 16 when the pulse data signal is received. The fault selection means 46 acts as the disconnection element when the detector means 44, 45 does not detect the continuous pulsed data signal. In other words, the fault selection means 46 will receive the outputs 16 from the communication link 12 and the enabling signal from the detector means 44, 45 and will replicate the information on the output 16 of the communication link 12 as along as the detector means 44, 45 has detected the continuous pulsed signal, and will transmit a low signal if the detector means 44, 45 has not detected a continuous pulsed data signal thereby disconnecting itself from the receiver means 13. The fault selection means 46 includes at least two fault selectors 47, 48 having a first fault selector 47 connected to the first detector 44 and the respected communication link 12, and a second fault selector 48 connected to the second detector 45 and the second communication link 12 for producing a serial data signal.

The receiver means 13 further includes redundant combining means 50 for producing a single serial data output. The redundant combining means 50 will combine each of the data signals from each of the fault selection means 46, and produce a single serial data output which is representative of the continuous pulse data signals sent from the transmitter means 11. The redundant combining means 50 performs a simple OR function on each of the fault selectors 47, 48 outputs.

The receiver means 13 further includes decoding means 52 for decoding the single serial output signal into a multiple of output lines 54 each representing one of the data slots of the pulsed serial signal. The decoder means 52 may comprise an existing commercially available integrated circuit chip 53 such as the Supertex ED-5, along with associated latches 55, 56. Each of the multiple output lines 54 will correspond with the data state on each of the multiple input lines 18. In other words, if a corresponding switch 22 is closed, then the output line associated therewith will contain a high signal. If a corresponding switch 22 is open, the output line 54 associated therewith will be low, producing an OFF signal. As an example, FIG. 4 shows a transistor 57 attached to the output lines driving a light 59 as a typical connection and use for the data transmitted by the multiplexer system.

Also included is a pull-up resistor R40 58 disposed at the output 16 of each communication link 12 for producing a high signal in the absence of any pulses on the communication link 12. For open circuits or positive shorts, the communication link 12 is pulled high by the pull-up resistor R40, and no pulses go through the detector means 44, 45. The output of detector means 44, 45 will then cause that communication link 12 to be electronically disconnected. When the communication link 12 is shorted to ground, no pulses will be generated by the detector means 44, causing that communication link 12 to be electronically disconnected. Also included is a protection series resistor R41 disposed on the output 16 of the communication links 12 to protect the receiver circuitry in the case that the communication link 12 contacts a higher than normal supply, as associated with "load dumping" of vehicles.

The receiver means 13 includes receiver power means 60 for discontinuing power to the decoder means 52 in absence of the pulsed signal in response to the enabling signal. The receiver power means 60 includes receiver delay means 62 for allowing selection of the outputs 16 from the fault selector means 46 for a predetermined time after an absence of the pulsed signal. The receiver power means 60 and the receiver delay means 62 is similar to that of the transmitter power means 36 and its associated transmitter delay means 38. After a predetermined time, after which no continuous pulsed signal is received, power will be discontinued to the decoder means 52, which includes the decoding chip 53 and the latches 55, 56. This will reduce the stand-by current drain to virtually zero when no data is being transmitted. This "hibernation" state only requires microamperes of supply current, and allows a multiplicity of receivers to remain on line in a vehicle with no deleterious effects on battery drain. When the detector means 44 detects a continuous pulsed signal during shut-down mode, a signal will be sent to the power supply means 60 which will initiate power to be supplied to the decoder means 52.

The receiver means 13 includes a first Schmitt trigger 51 connected to the protection series resistor R41 for producing an inverted control signal supplied to the detector means 44 and the fault selection means 46. Each of the fault selectors 47, 48 include fault NOR gate 47, 48 for OR-ing together the outputs and the enabling signals associated with each of the communication links 12 and inverting the output thereof producing the data signals. The redundant combining means 50 includes cascaded NOR gates 52, 53 for receiving the data signals to equal OR function and decoder voltage divider resistors R50, R51 producing the single data output to the decoder means 52. The decoder means 52 includes the decoder chip 53 and associated latches 55, 56, and a decoder capacitor C11 and resistor R51 externally controlling the chip 53. Each of the detectors 44, 45 include an input Schmitt trigger 54, a differentiator 56, an additional Schmitt trigger 58 and a detector delay means 61 for continuously holding the enabling signal in a low state when pulsed signals are received. As long as the enabling signal remains low, the fault selector 47, 48 acts as inverters. The output of the fault selectors 47, 48 will always be low if the detector means 44, 45 does not detect any pulsed signals, and therefore will allow the signal from the other or alternative communication link 12 to control. The differentiator 56 of the detector means 44, 45 includes a differentiating capacitor C4 receiving the signal from the input Schmitt trigger 54, a differentiator resistor R42 connected to the differentiating capacitor C4 and ground, and a parallel connected diode D19. The detector delay means 61 includes a diode D20 receiving the output from the additional Schmitt trigger 58, a detector delay capacitor C5 connected to the limiting diode D20 and ground, and a delay resistor R43 connected to the diode D20 and the voltage supply. The receiver power means 60 includes a first power control NAND gate 64 receiving each of the enabling signals from respective communication links 12 and a second power control NAND gate 66 receiving the signal from the first power control NAND gate 64 to supply power to the decoding means 52 when the pulsed signal is received. As long as one of the enabling signals are low, the receiver power means 60 will be ON. Parallel power control NAND gates 68, 70 are connected to the output of the second power control NAND gate 66. A power control means diode D21 receives the output from the parallel power NAND gates 68, 70. The delay means 62 includes first delay capacitor C6 connecting the output of the power control means diode D21 to the decoding means 52 for allowing the decoding means 52 to be powered for a time after the absence of the pulsed signal. A voltage divider circuit comprising two power control means resistors R44, R45 instantaneously disables the output enable ports of the latches 55, 56. This insures that no erroneous data will be latched in the output registers.

The output from the power control means diode D21 is connected through a receiver power control resistor R46 to the decoder chip 53 and latches 55, 56. A second delay capacitor C7 is connected to the output of the receiver power control resistor R46 and to ground.

Figure 5:
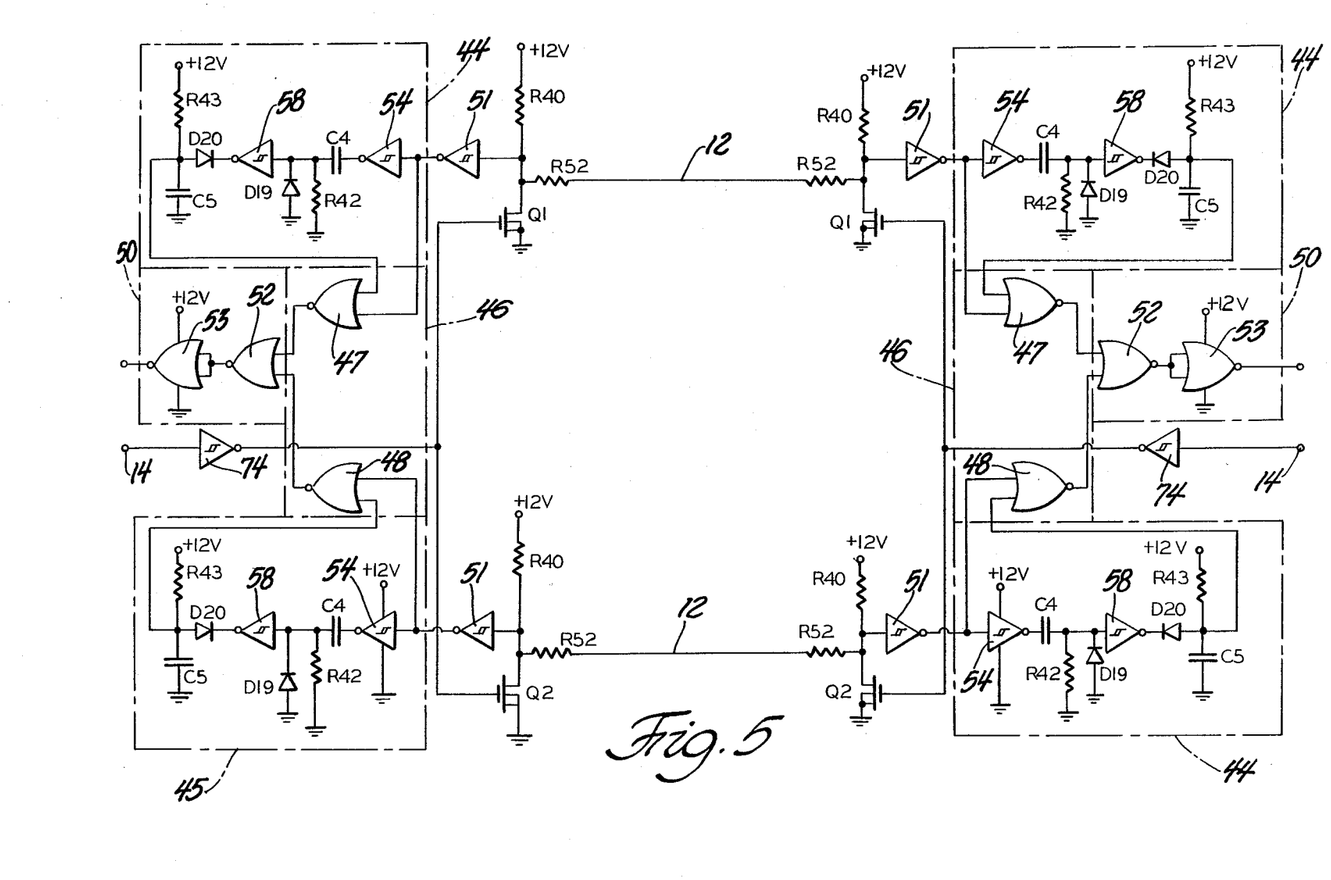
FIG. 5 is a portion of a circuit diagram for a half duplex multiplexor using the features of the subject invention.

The redundant principles above described in the one-way or simplex multiplex system may be applied to a two-way or half duplex multiplexer. The low current hibernation capability is still maintained. The fault tolerant, redundant feature is applicable to any serial multiplexing protocol, and can accommodate any of a large variety of data codes. All the features of the transmitter means 11 and receiver means 13 may be used in the bidirectional system. FIG. 5 illustrates the half duplex multiplexer illustrating the use of the detector means 44, 45, fault selector means 46, and redundancy combining means 50. Like numbers represent like features. The only addition is the use of a Schmitt trigger 74 on the inputs 14 of the communication links 12. The inputs 14 and outputs 16 are combined which include a current limiting resistor R52 wherein the current limiting resistor R52 act as the protection series resistors R41 and current limiting resistors R38, R39. Also included is the pull-up resistors R40, the FETs Q1, Q2 and the first Schmitt trigger 51. The data is in the form of the continuous pulse signal which drives the gates of the FETs Q1, Q2. Since both ends of the communication link 12 are identical, data may be transmitted or received from either end, but not simultaneously, for half duplex operation.

For critical applications, for those subject to greater probability of damage, greater redundancy can be provided. Expansion to more communication links 12 is simple and cost effective. More detectors 44, 45 would be added and the outputs simply be OR'ed as explained prior.

It is noted that the methodology described herein can be implemented by other circuitry or as an algorithm in a microprocessor system. The basic principle of assuring redundant fault tolerance is the same.

Also provided is a method of communicating electrical signals along multiple communication links 12 from a transmitter means 11 to a receiver means 13 while being tolerant of a shorting to either positive or negative power supply or discontinuance of any one of the links. The method includes the steps of transmitting 11 identical and continuous pulsed signals containing at least one pulse between inputs 14 and outputs 16 of the multiple communication links 12, receiving 13 the pulsed signal by the receiver means 13 and producing at least one control signal in response thereto, sensing the absence of the pulse signal on the communication links 12, and electrically disconnecting any of the communication links 12 from receiver means 13 by producing enabling signals to the receiver means in response to an absence of the continuous pulsed signal on any one of the outputs 16. The method of receiving includes receiving 46 the outputs and enabling signals for producing data signals replicating of the outputs 16 when the pulsed signal is received, combining 50 the data signal to produce a single data output, decoding 52 the single output signal into a multiple of output lines. The method of transmitting includes selecting 20 information from a plurality of input lines 18 to be transmitted, encoding 24 the multiple input lines 18 into a single serial output line, sending the single serial output along at least two communication links 12, discontinuing 36 power for the encoding and sending when no selection is made.

LIST OF COMPONENTS

RESISTORS

| Ref. No. | Value (Ohms) |
| --- | --- |
| R33, R38, R39, R46 | 2.2k |
| R49, R51 | 3.3k |
| R40 | 4.7k |
| R2, R4, R6, R8, R10 | 10k |
| R12, R14, R16, R18 | 10k |
| R20, R22, R24, R26, R28 | 10k |
| R41, R42, R45, R50 | 10k |
| R1, R3, R5, R7, R9 | 15k |
| R11, R13, R15, R17 | 15k |
| R19, R21, R23, R25 | 15k |
| R27, R29, R44, R49 | 15k |
| R35 | 100k |
| R34, R43 | 220k |
| R36, R37 | 1 M |

CAPACITORS

| Ref. No. | Value (Farads) |
| --- | --- |
| C4 | 1000 p |
| C9 | .1 u |
| C10, C11 | .0047 u |
| C2, C7 | 10 u |
| C6 | 220 u |
| C1 | 220 m |
| C5 | .1 |

ADDITIONAL COMPONENTS

| Ref. No. | Type |
| --- | --- |
| D1–D15 | 1N4148 |
| 55, 56 | CD4094 |

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. An assembly for communicating electrical signals along multiple links while being tolerant of shorting to a positive or negative supply or to discontinuance of any one of the links, said assembly comprising; at least two communication links (12) for transmitting signals therealong between inputs (14) and outputs (16) thereof, transmitter means (11) connected to said inputs (14) of said communication links (12) for identical and continuous transmission of a pulsed signal containing at least one pulse along said communication links (12), receiver means (13) connected directly to said outputs (16) of said communication links (12) for producing at least one control signal in response to receiving said pulsed signal, said assembly characterized by including detector means (44, 45) independently interconnecting each of said communication links (12) and said receiver means (13) for producing enabling signals to electrically disconnect said receiver means (13) from any one of said communication links in response to an absence of a successive pulsed signal within a predetermined period of time on said output (16) of said one of said communication links (12).

2. An assembly as set forth in claim 1 further characterized by said detector means (44, 45) including at least a first detector (44) for independently connecting one of said communication links (12) to said receiver means (13) and a second detector (45) for connecting a second of said communication links (12) to said receiver means (13).

3. An assembly as set forth in claim 2 further characterized by said receiver means (13) including fault selection means (46) for receiving said outputs (16) and said enabling signals to produce data signals replica of said outputs (16) when said pulsed signal is received.

4. An assembly as set forth in claim 3 further characterized by said fault selection means (46) including a first fault selector (47) connected to said first detector (44) and said respective communication link (12) and a second fault (48) selector connected to said second detector (45) and said respective communication link (12) for producing said data signals.

5. An assembly as set forth in claim 2 further characterized by said receiver means (13) including redundant combining means (50) for receiving said data signals and combining to produce a single data output.

6. An assembly as set forth in claim 5 further characterized by said transmitter means produces a pulsed signal including a data frame having a plurality of timed pulse slots each representative of information.

7. An assembly as set forth in claim 6 further characterized by said receiver means (13) including decoding means (52) for converting said single data output into a multiple of output lines each representing one of said slots of said pulsed signal.

8. An assembly as set forth in claim 7 further characterized by said receiver means (13) including receiver power control means (60) for discontinuing power to said decoder means (52) in an absence of said pulsed signal in response to said enabling signal.

9. An assembly as set forth in claim 8 further characterized by said receiver power control means (60) including delay means (62) for discontinuing power to said decoding means (52) after a predetermined time delay.

10. An assembly as set forth in claim 9 further characterized by each of said fault selection means (46) including a NOR gate (47, 48) for OR'ing together said output (16) and said enabling signal associated with each of said communication links (12) and inverting the output thereof to produce said data signals, and by said redundant combining means (50) including cascaded NOR gates (52, 53) for receiving said data signals to produce said single data output.

11. An assembly as set forth in claim 10 further characterized by each of said detectors (44, 45) including a Schmitt trigger (51), a differentiator (56), an additional Schmitt trigger (58) and a delay means (61) for continuously holding said enabling signal in a low state when said pulsed signals are received.

12. An assembly as set forth in claim 11 further characterized by said outputs (16) of each of said communication links (12) including a pull-up resistor (R40) connected between said output (16) and a voltage supply for pulling high the communication link (12) when said communication link (12) is discontinued or positively shorted, and by including a first Schmitt trigger (51) connected to said outputs (16) for producing an inverted control signal supplied to said detector means (44, 45) and said fault selection means (46).

13. An assembly as set forth in claim 12 further characterized by said receiver power control means (60) including a first NAND gate (64) receiving each of said enabling signals from respective communication links (12) and a second NAND gate (66) for receiving the signal from said first NAND gate to supply power to said decoding means when said pulsed signal is received, by said delay means (62) including capacitive means connecting the output of said parallel NAND gates (68, 70) to said decoding means (52) for allowing said decoding to be powered for a time after the absence of said pulsed signal.

14. An assembly as set forth in claim 7 or 14 further characterized by said transmitter means (11) including multiple input lines (18) for providing said data slots With information, and selection means (20) for selecting the data information from said multiple input lines to be transmitted along said communication links (12) representing said data slots and wherein said selection means (20) includes switch means (22) connected between each of said multiple input lines (18) and said encoding means (24) for closing when information is to be transmitted.

15. An assembly as set forth in claim 14 further characterized by said transmitter means (11) including encoding means (24) for converting said multiple input lines (18) into a single serial data output line containing said data slots.

16. An assembly as set forth in claim 15 further characterized by said transmitter means (11) including redundant sender means (28) for receiving said single serial data output line and producing said continuous pulsed signals on each of said communication links (12).

17. An assembly as et forth in claim 16 further characterized by said redundant sender means (28) including transistor means (30) for transmission of said pulsed signal along each of said communication links (12), and including intermediate means (32) for receiving said single output data line and driving said transistor means (30).

18. An assembly as set forth in claim 17 further characterized by said transmitter means (11) including transmitter power control means (36) for discontinuing power to said encoding means and said redundant sender means (28) when said switch means (22) are open.

19. An assembly as set forth in claim 18 further characterized by said transmitter power control means (36) including delay means (38) connected between said switch means (22) and said encoding means (24) and redundant sender means (28) for delaying the discontinuation of power for a predetermined time.

20. An assembly as set forth in claim 19 further characterized by said transmitter power control means (36) including preventative means (40) connected to said intermediate means (32) for preventing the transmission of erroneous information by holding the output of said intermediate means (32) low.

21. An assembly as set forth in claim 20 further characterized by said transmitter power control means (36) including diode means (D1-D16) connected to the output of said switch means (22) for supplying power to said transmitter power control means (36) only when at least one of said switches (22) is closed.

22. An assembly as set forth in claim 21 further characterized by said intermediate means (32) including respective NOR gates (34, 35) associated with each of said communication links (12) for receiving said serial data output line and the output of said preventative means (40) driving said transistor means (30), and said transistor means including FETs (Q1, Q2).

23. A method for communicating electrical signals along multiple communication links from a transmitter means to a receiver means while being tolerant of shorting to a positive or negative supply or discontinuance of any one of the links, said method including the steps of; transmitting identical and continuous pulsed signals containing at least one pulse between inputs and outputs of the multiple communication links, receiving the pulsed signal by the receiver means and producing at least one control signal in response thereto, sensing the absence of the pulsed signal on the communication links, and electrically disconnecting any of the communication links from the receiver means by producing enabling signals to the receiver means in response to an absence of a successive pulsed signal within a predetermined period of time on any one of the outputs.

24. A method as set forth in claim 23 further including receiving the outputs and enabling signals to produce data signals replicating the outputs when the pulsed signal is received, and combining the data signals to produce a single data output, and decoding the single data output into a multiple of output lines.

25. A method as set forth in claim 24 further including selecting information from a plurality of input lines to be transmitted, and encoding the multiple input lines into a single serial data output line, and sending the single serial data output along at least two communication links.

26. A method as set forth in claim 25 further including discontinuing power for the decoding when no input data selection is made.

27. A method as set forth in claim 26 further including discontinuing power from the transmitting means when no selection is made from the multiple input lines.

28. An assembly for communicating electrical signals along a communication link said assembly comprising; at least two communication lines (12) having inputs (14) and outputs (16) for transmitting signals therealong between said inputs (14) and said outputs (16) thereof, transmitter means (11) connected to said inputs (14) of said communication links (12) for identical and continuous transmission of a pulsed signal containing at least one pulse along said communication links (12), receiver means (13) connected to said outputs (16) of said communication links (12) for producing at least one control signal in response to receiving said pulsed signal, detector means (44, 45) independently interconnecting each of said communication links (12) and said receiver means (13) for producing enabling signals to electrically disconnect said receiver means (13) from any one of said communication links in response to an absence of said continuous pulses signal on said output (16) of said one of said communication links (12), said receiver means (13) including fault selection means (46) for receiving said outputs (16 and said enabling signals to produce data signals replica of said outputs (16) when said pulsed signal is received and redundant combining means (50) for receiving said data signals and OR'ing respective pulses from each of said communication links (12) to produce a single data output.

* * * * *